(12) United States Patent
Desimone (10) Patent No.: US 7,992,903 B1
(45) Date of Patent: Aug. 9, 2011

(54) FLEX-DUCT END CONNECTOR

(76) Inventor: Frank J. Desimone, Santa Barbara, CA (US)

(*) Notice: Subject to any disclaimer, the term of this patent is extended or adjusted under 35 U.S.C. 154(b) by 421 days.

(21) Appl. No.: 12/346,486

(22) Filed: Dec. 30, 2008

(51) Int. Cl.
*F16L 23/00* (2006.01)

(52) U.S. Cl. ............... 285/419; 285/915; 285/294.4

(58) Field of Classification Search ............ 285/419, 285/242, 241, 285.1, 286.1, 290.1, 290.2, 285/290.3, 290.4, 293.1, 294.1, 294.2, 294.3, 285/294.4, 915
See application file for complete search history.

(56) References Cited

U.S. PATENT DOCUMENTS

| | | | | |
|---|---|---|---|---|
| 539,112 | A * | 5/1895 | Barrett | 285/285.1 |
| 590,258 | A * | 9/1897 | Dale | 285/241 |
| 602,617 | A * | 4/1898 | Dale | 285/241 |
| 2,076,632 | A * | 4/1937 | Goodall | 285/55 |
| 2,086,276 | A * | 7/1937 | Lindas | 249/65 |
| 2,660,199 | A * | 11/1953 | Montgomery | 403/12 |
| 2,756,479 | A * | 7/1956 | Garneau | 425/129.1 |
| 2,986,411 | A * | 5/1961 | Anderson | 285/293.1 |
| 3,217,077 | A * | 11/1965 | Cocke | 264/256 |
| 3,228,712 | A * | 1/1966 | Hausmann et al. | 285/45 |
| 3,708,185 | A * | 1/1973 | Bilicki et al. | 285/42 |
| 4,620,729 | A * | 11/1986 | Kauffman | 285/136.1 |
| 4,776,369 | A * | 10/1988 | Lardner et al. | 137/515.5 |
| 4,930,815 | A * | 6/1990 | Tuggler, Jr. | 285/142.1 |
| 5,429,397 | A * | 7/1995 | Kanao | 285/290.3 |
| 5,505,497 | A * | 4/1996 | Shea et al. | 285/55 |
| 5,980,670 | A * | 11/1999 | Andre | 156/153 |
| 7,083,204 | B1 * | 8/2006 | Miller et al. | 285/293.1 |
| 7,338,085 | B2 * | 3/2008 | Toriyabe et al. | 285/21.2 |
| 7,393,021 | B1 * | 7/2008 | Lukjan | 285/424 |
| 2006/0186664 | A1 * | 8/2006 | Huang | 285/242 |
| 2007/0007765 | A1 * | 1/2007 | Ingram | 285/242 |
| 2010/0126616 | A1 * | 5/2010 | Kanao | 138/122 |
| 2011/0042940 | A1 * | 2/2011 | Kozak et al. | 285/242 |

* cited by examiner

*Primary Examiner* — Aaron Dunwoody
(74) *Attorney, Agent, or Firm* — Richard S Erbe (57) ABSTRACT

A flex-duct end connector for connecting flex-ducting to fittings includes a cylindrical pipe and a pair of clamps configured to be mounted on the outside of the pipe. The outer surface of the pipe and the inner surfaces of the clamps may be provided with an adhesive to improve the connection. Outer wraps attached to the outside of the pipe include an adhesive side and a non-adhesive side. One end of the pipe may be tapered and the other end may include a rubberized coating. To connect the flex-ducting to the fitting, the insulation and outer jacket of the flex-duct is folded back from the liner. The liner slides over one end of the pipe. Adhesive may be provided on the pipe to provide a more secure fit. The clamps, which may also be provided with adhesive, are applied to the liner and pipe. The edges of the clamps overlap so that a fastener may be inserted through the clamps, the liner and the pipe. The insulation and outer jacket are then pulled over the clamps, and the outer wraps are deployed so that the adhesive side of each is applied to the outer jacket. The other end of the flex-duct end connector is inserted in the fitting. Zip ties or the like may be used at various points of the connecting process.

18 Claims, 5 Drawing Sheets

FLEX-DUCT END CONNECTOR

RELATED APPLICATIONS

Not applicable.

BACKGROUND OF THE INVENTION

1. Field of the Invention

The present invention relates to the field of heating, ventilating, and air conditioning (HVAC). More specifically, the present invention relates to a novel connector for connecting flex-duct to a fitting, such as a tee, an elbow, y-branch connector, starter collar or a register boot.

2. General Background and State of the Art

With the rising costs of energy and increased attention to environmental concerns, businesses, consumers, and governmental agencies at all levels are bringing concerted efforts to reduce energy consumption and waste and to protect the environment. In the HVAC trade, several major changes have been made in recent years to address these concerns, such as the use of less harmful refrigerants, the development of more energy efficient equipment, more stringent energy and environmental codes, and enforcement of those codes.

One area in the HVAC trade that has not been effectively addressed and that has been identified as a leading source of energy loss in both domestic and commercial applications is air leakage due to connection failure in flex-ducting. Flex-ducting is a remarkable product and is the most commonly used form of residential air ducting, because of the ease with which it may be routed through and around, over and under rafters, electrical wiring and fixtures. It has effectively eliminated the limitations of a rigid sheet metal duct system. Flex-ducting is available in many diameters, generally ranging between four inches and 22 inches, and is usually sold in 25-foot lengths that can be easily cut to an appropriate length. Flex-ducting is constructed in three layers: 1) an inner liner having a wire coil support; 2) an insulation layer over the liner; and 3) an outer jacket covering the liner and the insulation layer. Flex-ducting typically is run between sheet metal plenum starter collars to other sheet metal fittings such as Y's, elbows, T's and register boots. While, as mentioned, flex-ducting is easy to cut to length, connecting the flex-ducting ends to a fitting is where the potentially serious problems lie and also represents the most time-consuming and labor intensive part of the installation of flex-ducting.

The conventional method used by HVAC installers to connect flex-ducting to a fitting has been to first fold back the outer jacket and insulation from the liner, slide the liner onto the fitting, and wrap duct tape around the connection at least three times. Most applicable codes specify the type of duct tape and the number of times the duct tape must be wrapped around the connection between the liner and the fitting; three times around a duct edge and a fitting is a typical code requirement. After that part of the connection process is complete, the insulation and outer jacket are pulled over the duct-taped connection and another type of duct tape (as specified in most applicable codes) is wrapped around the connection between the insulation/jacket and the fitting a specified number of times. After that step is completed, a securing means such as a zip tie is usually secured around the connection.

There are problems with the just-described method of connection that have led to considerable waste of energy due to leakage of air at the connection of the flex-ducting and the fitting. Installers frequently work in confined spaces and may not be able to readily view or comfortably reach the entire area of the connection, which can mean that the application of the duct tape is awkward and the quality of the connection is compromised. The biggest problem with this type of connection over time, however, is that the flex-ducting comes apart from the fitting and cause considerable leakage, either because of movement of the flex-ducting or because the duct tape becomes brittle from heat or age. Plastic zip ties become brittle and break over time.

While most such connections may hold well enough to pass an initial inspection, the continuous flow of hot or cool air will eventually dry out the duct tape and the connection will fail. Other contributing factors that lead to connection failures are dust cleaning, movement of other trades people moving around, over and under the flex-ducting, or movement of the flex-ducting by such individuals during other projects.

During 2004, the United States government, along with the State of California and several Energy Commissions funded a study of durability of various duct tapes and adhesives used for connecting flex-ducting to fittings. The conclusions of the study were two-fold: 1) none of the duct tapes or adhesives proved durable enough to pass the tests of time and temperature; and 2) due to features inherent in the design of flex-ducting, the insulation and outer jacket cover or wrap the connection between the liner and the fitting from view, thus impeding enforcement of the use of approved sealants, duct tapes, or procedures. No solutions were offered.

During 2007, the State of California Energy Commission tried to address some of the problems inherent in the use of flex-ducting with the passage of code amendments and requirements under Title 24. Under the amended and updated codes, duct leak tests are required during installation. While this requirement may lead to more diligent and careful installation practices, it can only increase the time and costs of installation and does nothing to improve the flawed connection procedure or increase the longevity of the inferior materials used in the currently mandated method of flex-duct connecting. Flex-duct connections will continue to fail with time and the failures may occur in hard-to-access locations.

It would therefore be desirable to provide a flex-duct connector and method of connecting flex-ducting to fittings that overcomes the disadvantages of the conventional connection and installation methods.

SUMMARY OF THE INVENTION

It is therefore an object of the present invention is to provide a flex-duct end connector that creates a tight and secure connection between flex-ducting and a fitting.

Still another object of the present invention is to provide a flex-duct end connector that is easy to install.

Another object of the present invention is to provide a flex-duct end connector that requires less time and labor to install than conventional connectors.

It is yet another object of the invention to provide a flex-duct end connector that will provide an air-tight seal over a longer period of time than conventional connectors.

A further object of the invention is to provide a flex-duct end connector that will make it more difficult to move the flex-duct away from the fitting to which it is connected.

Still another object of the invention is to provide a flex-duct end connector that is easy to use in confined spaces.

Yet another object of the invention is to provide a flex-duct end connector that will provide an easy means for an inspector to determine the type of connection that has been used during installation.

Another object of the invention is to provide a flex-duct end connector that eliminates the use of duct tape for connecting flex-duct to fittings.

Still another object of the invention is to provide a flex-duct end connector that includes using adhesives and compression as well as providing identification of a fitting all in one package.

These and other objectives are achieved by the present invention, which, in a broad aspect, provides a flex-duct end connector that finishes off, seals and secures the ends of flex-duct runs. The flex-duct end connector of the present invention is constructed in the general shape of a cylindrical pipe and a clamping means configured to fit on the outside of the pipe, sandwiching the liner of the flex-duct. The cylindrical pipe may be constructed in a variety of lengths; however, the inventor has found that a pipe about six inches in length works well for providing adequate surface for forming a seal. While not intending to limit the present invention to the following, in the preferred embodiment of the invention, the clamping means includes a pair of semi-cylindrical clamps whose ends will overlap when they are applied during the connecting procedure. Preferably, the clamps are constructed of galvanized sheet metal.

The outer surface of the pipe and the inner surfaces of the clamps may incorporate an adhesive, which could be a paste, tape, glue or pressure applied glue pads to provide a more secure connection. The adhesive used should be of a consistency that allows flex-ducting to easily slide over the pipe. The clamps may be connected to the cylindrical pipe by a hinge means or a tab and slot configuration, or the clamps may be provided completely separate from the pipe. When provided as a packaged unit, a protective guard, such as a cardboard sheet, may be positioned between the clamps and the pipe to protect any adhesive, if applicable. The pipe and clamps may come in a variety of diameters to accommodate the various sized of flex-duct and are preferably constructed of sheet metal. Turned or raised ridges on both the pipe and the clamps provide additional strength to the pipe and clamps. One of the clamps has one or more receivers for insertion of fasteners as part of the connection. Preferably, such fasteners would be self tapping sheet metal screws and the one or more receivers would have a raised surface.

The first end of the cylindrical pipe, the one that connects to the flex-ducting, preferably has a taper to make the flex-ducting slide more easily over the pipe and to properly position it on the pipe. The second end of the pipe, which connects to the fitting, may have a portion that has a rubberized coating. The rubberized coating provides a self-sealing capability with the fitting. The second end of the cylindrical pipe may be smooth or may be field crimped, depending on whether the second end connects to a male (crimped) or female connection on the fitting.

Another feature of the flex-duct end connector according to the preferred embodiment of the invention is the inclusion of a number (preferably two) of outer wraps which are attached to the cylindrical pipe and folded into the body of the pipe. Each of the outer wraps includes an adhesive side having an adhesive covered by a peel-off backing and a non-adhesive side that includes an identifying element so that during an inspection of the air ducting installation, an inspector can easily identify the type of flex-duct connector by simply having to observe the connection. The identifying element could be a color, such as a bright fluorescent orange, and/or a company logo identifying the source of the flex-duct end connector.

The use of the flex-duct end connector according to the preferred embodiment of the present invention can reduce the time spent on the connection of the flex-ducting to a fitting by fifteen or twenty minutes per connection. On a properly-done air ducting installation project, there may be as many as forty such connections, so use of the flex-duct end connector of the present invention can save ten or more hours on the installation process, resulting in several hundred dollars in savings on the labor costs and additional future savings because of the integrity of the connection(s). Another advantage of using the flex-duct end connector according to the present invention is that the flex-duct end to which the connector is to be connected can be temporarily moved to a more accessible location while the connection between the connector and the flex-duct is being made, rather than having it to be made at the location of the fitting, which may be in a cramped and not easily accessed location.

Briefly, when making the connection between the flex-ducting end and the fitting using the connector of the present invention, the insulation and outer jacket on the end of the flex-duct is folded back a few inches, exposing the liner. The installer then slides the liner over the first end of the cylindrical pipe until the liner covers at least one of the raised ridges on the pipe's surface. Adhesive may be included on the surface of the pipe to further secure the liner to the pipe. The type of adhesive may vary, but a preferred adhesive would be of the type requiring manual pressure to the liner to make the adhesive more effective. A compressible glue pad would be one type of adhesive that would be effective in the present application.

The clamping means is then applied to cover the liner. Each of the individual clamps are configured to provide a tight fit over the pipe and liner. The clamps have a shape similar to the pipe and include raised ridges on their outer surfaces that correspond to the locations of the raised ridges on the pipe. The clamps may be hingedly connected to the pipe or may be completely separate from it. The inner surfaces of the clamps may also be provided with a suitable adhesive. The clamps are applied to the outside of the pipe such that the ends of the clamps overlap. When pressed together, the clamps sandwich the liner between two layers of sheet metal. If adhesive is present on the facing pipe and clamp surfaces, application of the clamps provides an even better connection between the liner and the connector.

The clamps may be further secured by a securing means, such as a zip tie, a hasp and grip combination, a tab in slot, a hose clamp screw tightened mechanism, or a sliding channel with a progressive button lock system. The overlapping ends of the clamps include one or more receivers for fasteners, preferably self tapping sheet metal screws. Each fastener is inserted through the receiver, the overlapping ends and through the liner and pipe. This way, the liner can never break away from the pipe, providing assurance that leakage will not occur after extended use.

The insulation and outer jacket of the flex-ducting is then pulled over the clamping means and any applied securing mean. The outer wraps are then deployed from the cylindrical pipe. The adhesive backing on each of the outer wraps is removed and the adhesive side of the wraps is applied to the outer jacket of the flex-duct. The non-adhesive side of the outer wraps may include an identifying element, such as a highly visible color (for example, fluorescent orange) and/or a company logo, which makes for easy identification of the type of connector used. A securing means such as a draw string or a zip tie may be installed over the outer wraps once they are in place.

To complete the connection, the second end of the cylindrical pipe is connected to the fitting by inserting it into or pulling it over the fitting. Where accessibility to the fitting is difficult or impeded, this last step of the connection process is the only one of the steps that must be made where the fitting is located.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the preferred embodiments of the invention with reference to the drawings in which.

DETAILED DESCRIPTION OF THE PREFERRED EMBODIMENT OF THE INVENTION

In the following description of the invention, reference is made to the accompanying drawings, which form a part thereof, and in which are shown, by way of illustration, an exemplary embodiment illustrating the principles of the flex-duct end connector of the present invention and how it may be practiced. It is to be understood that other embodiments may be utilized to practice the present invention and structural and functional changes may be made thereto without departing from the scope of the present invention.

A flex-duct end connector according to an exemplary embodiment of the present invention is indicated by the numeral 10 and is best illustrated in FIGS. 1-4. The principle components of flex-duct end connector 10 are cylindrical pipe 12, clamping means 40 and outer wraps 80.

Cylindrical pipe 12 includes an outer surface 14, inner surface 16, first end 24 and second end 28. Outer surface 14 includes one or more turned or raised ridges 18 to provide structural strength. Cylindrical pipe 12 is preferably constructed of sheet metal and can be made in a variety of diameters to accommodate various sizes of flex-ducting, the most commonly-found diameters ranging between four and twenty-two inches. First end 24 may also include a tapered portion 26 to make the connection to flex-ducting easier. Second end 28 may also include crimping 30 (generally done during field installation) depending on the characteristics of the fitting to which pipe 12 is attached (i.e., whether it is male or female). Second end 28 may also include rubberized coating 32 to provide an air-tight fit. Adhesive 20 may be applied to outer surface 14 in the form of glue, epoxy, tape, self-releasing compressible glue pads or the like.

Clamping means 40 includes a pair of clamps, semi-cylindrical first clamp 42 and semi-cylindrical second clamp 60. First and second clamps 42 and 60 are configured to fit tightly over cylindrical pipe 12 during the connection procedure, which will be described shortly. Clamps 42 and 60 may be attached to cylindrical pipe 12 by connecting means 76 or may be provided as removable components that are initially unattached to cylindrical pipe 12. Preferably, a tab and slot configuration (as illustrated) attaches each clamp to the pipe and properly positions the clamp relative to the pipe during installation. A hinge connection may also be used as connecting means 76. Clamps 42 and 60 are preferably constructed from sheet metal.

First clamp 42 includes outer surface 44, inner surface 46, first end 52 and second end 54. Opposed edges 56 connect first end 52 and second end 54. Inner surface 46 may also be provided with adhesive 50, which may be in the form of glue, epoxy, tape, pressure sensitive glue pads or the like. First clamp 42 also includes at least one raised ridge 48 which, when clamping means 40 is applied to cylindrical pipe 12 during the connection process, will align with one of the raised ridges 18 in cylindrical pipe 12.

Second clamp 60 includes outer surface 62, inner surface 64, first end 70 and second end 72. Opposed edges 74 connect first end 70 and second end 72. Inner surface 64 may also be provided with adhesive 68, which may be in the form of glue, epoxy, tape, compressible self-releasing glue pads or the like. Second clamp 60 also includes one or more receivers 58 through which a fastener 96, preferably a self tapping sheet metal screw, may be inserted into each. When using a self tapping sheet metal screw, receiver 58 should have a raised surface. Second clamp 60 also includes at least one raised ridge 66 which, when clamping means 40 is applied to cylindrical pipe 12 during the connection process, will align with one of the raised ridges 18 in cylindrical pipe 12.

Figure 1:
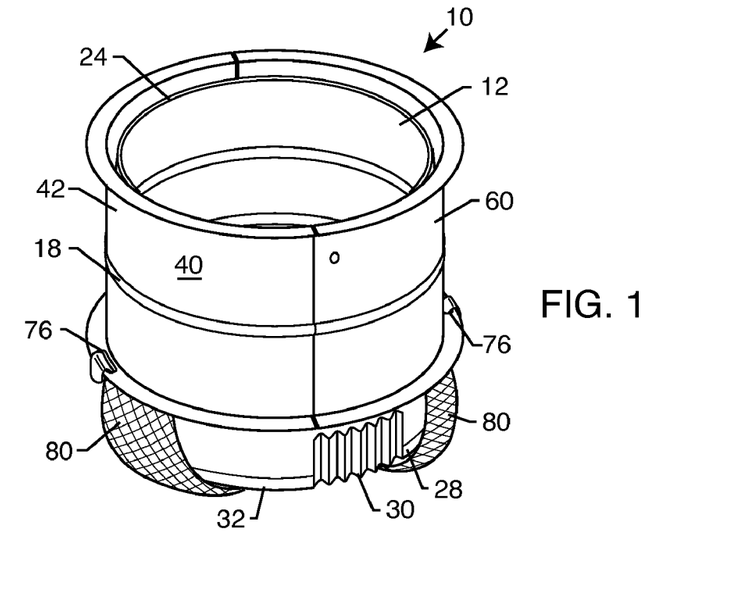
FIG. 1 illustrates a perspective view of an exemplary embodiment of a flex-duct end connector according to the present invention, with the clamps closed on the pipe.
Figure 2:
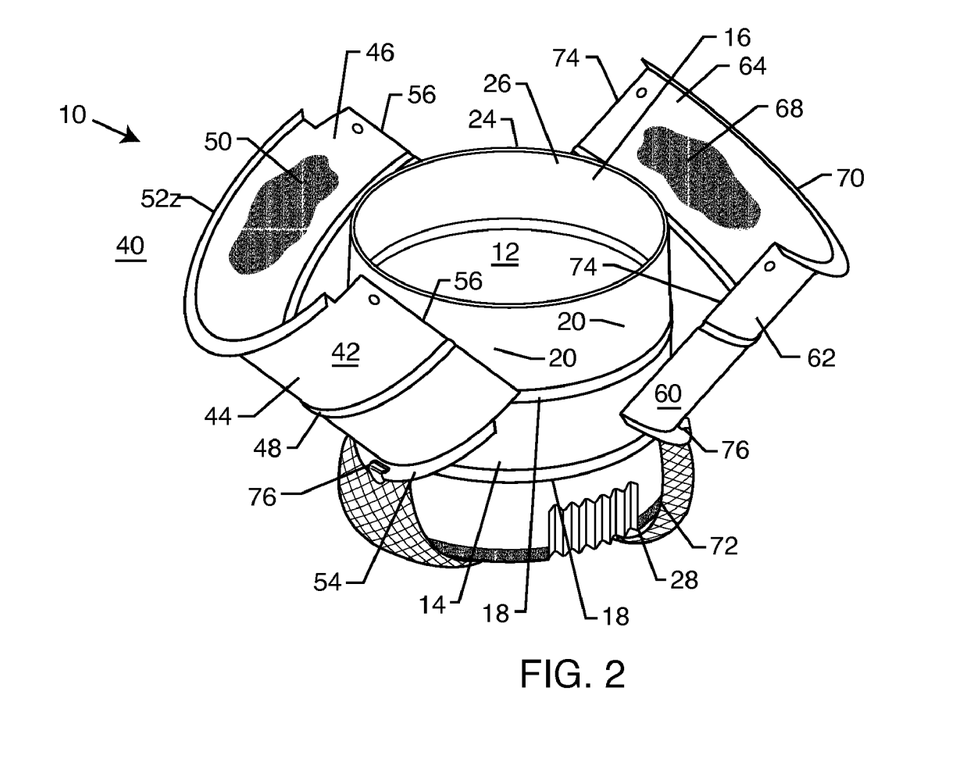
FIG. 2 illustrates perspective view of an exemplary embodiment of a flex-duct end connector according to the present invention, with the clamps open.
Figure 3:
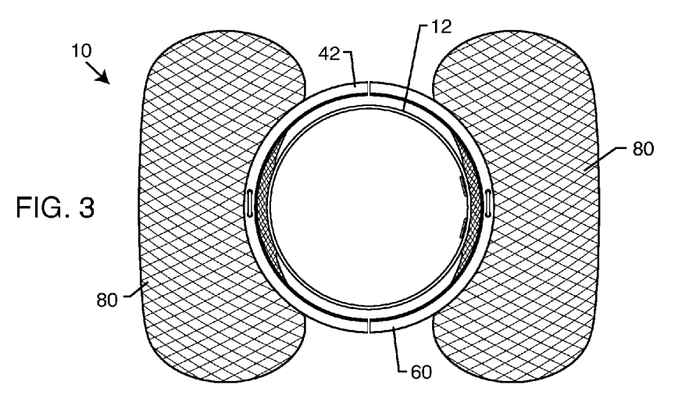
FIG. 3 illustrates an end view of an exemplary embodiment of a flex-duct end connector according to the present invention.

It should be noted, as best shown in FIGS. 1 and 2, that opposed edges 56 on first clamp 42 are configured to overlap opposed edges 74 on second clamp 60 when clamping means 40 is applied during the connection procedure.

Figure 4:
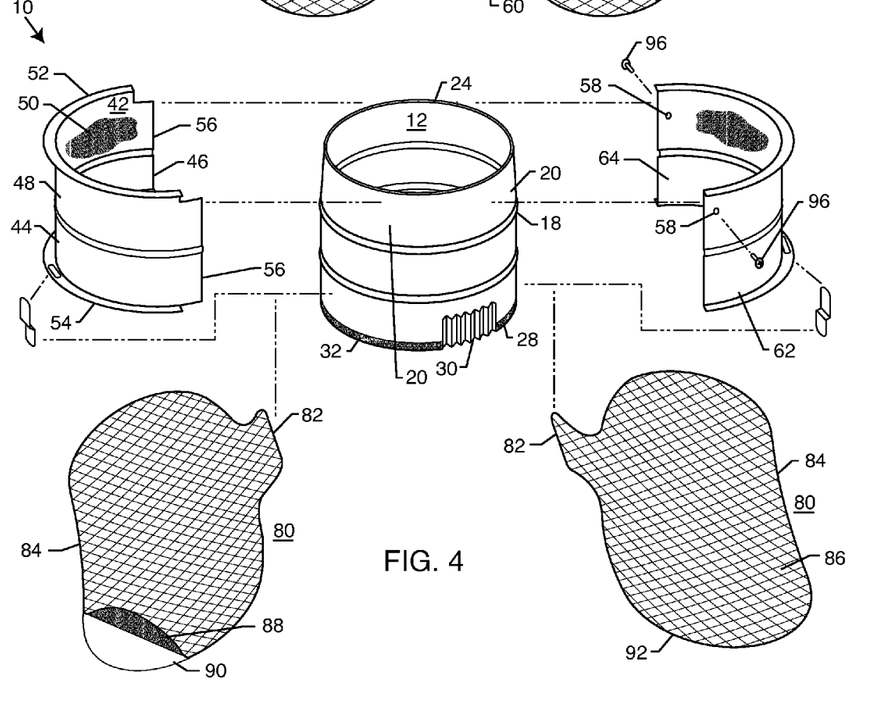
FIG. 4 illustrates an exploded view of an exemplary embodiment of a flex-duct end connector according to the present invention.

Flex-duct connector 10 also is equipped with a plurality of outer wraps 80, which are best illustrated in FIG. 4. Each outer wrap 80 includes a first end 82 attached to cylindrical pipe 12, a second end 84, an adhesive side 86 which is covered initially by a protective backing 88 and a non-adhesive side 92. Adhesive side 86 includes adhesive 90 for securing the flex-ducting to flex-duct end connector 10, as will be discussed. Non-adhesive side 92 includes identifying element 94, which may be a highly visible color (such as a fluorescent orange) and/or a company logo, for example, to allow a building inspector to more easily identify the type of connection that is being used.

Figure 5:
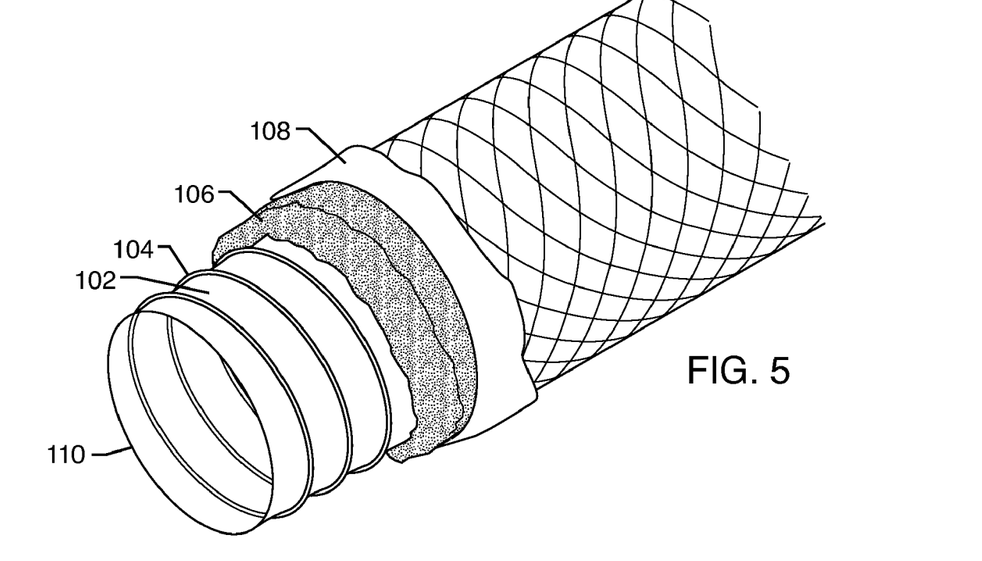
FIG. 5 illustrates an end view of flex-ducting for connection to an exemplary embodiment of a flex-duct end connector according to the present invention.

FIG. 5 illustrates an end view of flex-ducting 100 at its connecting end 110. Flex-ducting 100 includes liner 102 having an embedded wire coil support 104, insulation 106 and outer jacket 108.

Method of Connection Using the Flex-Duct End Connector. FIGS. 6-11 illustrate how flex-ducting 100 is connected to flex-duct end connector 10 and fitting 120. Fitting 120 may be any of the known HVAC fittings, such as starter collars, Y's, elbows, T's and register boots.

Figure 6:
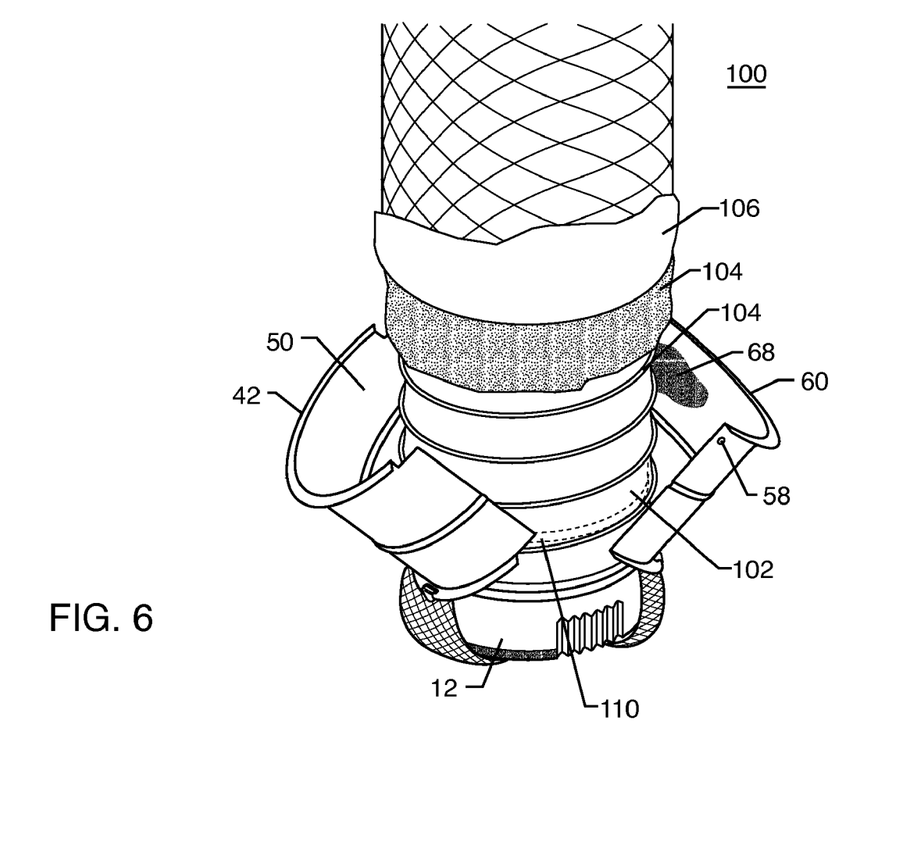
FIGS. 6-11 illustrate the steps involved in connecting flex-ducting to a fitting using an exemplary embodiment of a flex-duct end connector according to the present invention.

To start the connection method, insulation 106 and outer jacket 108 are folded away from liner 102 at connecting end 110 of flex-duct 100, as shown in FIGS. 5 and 6. Liner 102 is then pulled over outer surface 14 at first end 24 of cylindrical pipe 12 until liner 102 overlaps at least one of raised ridges 18 as illustrated in FIG. 6. If outer surface 14 includes adhesive 20, pressure may be applied to liner 102 to assure a firmer attachment. First end 24 preferably includes a tapered portion 26 to make it easier to slide liner 102 over cylindrical pipe 12.

Figure 7:
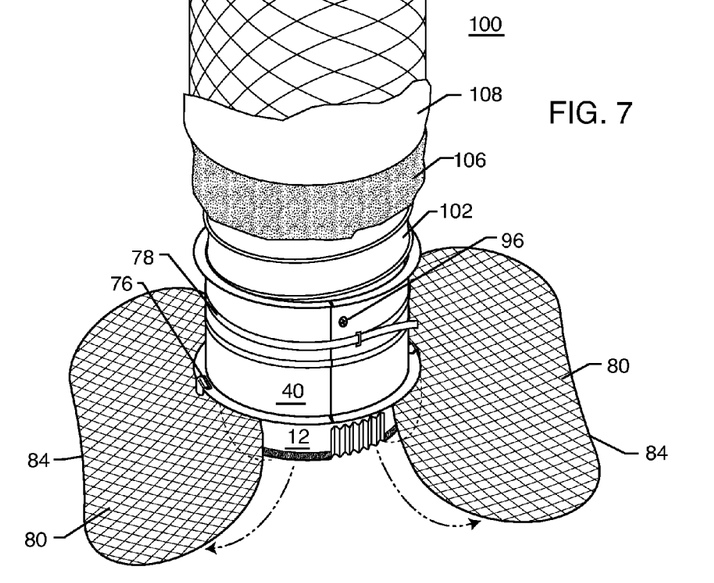

As illustrated in FIG. 7, clamping means 40 is applied over liner 102 and cylindrical pipe 12 by means of placing first clamp 42 and second clamp 60 such that the opposed edges 56 of first clamp 42 and opposed edges 74 of second clamp 60 overlap. Raised ridge 48 on first clamp 42 and raised ridge 66 on second clamp 60 should be aligned with one of the raised ridge 18 on cylindrical pipe 12 that liner 102 overlaps.

A securing means 78, such as a hose clamp, zip tie, hasp and grip combination, a sliding channel with a progressive button lock system, a tab in slot, or other commonly known securing means may then be applied on the outer surfaces 44 and 62 of first clamp 42 and second clamp 60. FIG. 7 shows securing means 78 in the form of a zip tie for illustration purposes.

Second clamp 60 includes at least one receiver 58 for insertion of a fastener 96, preferably a self tapping sheet metal screw. Each receiver 58 is located where the edges 56 and 74 of clamps 42 and 60 overlap each other. Each fastener 96 is inserted through receiver 58 and passes through first clamp 42, liner 102, and cylindrical pipe 12.

Inner surface 46 of first clamp 42 may be provided with an adhesive 50, and inner surface 64 of second clamp 60 may also be provided with an adhesive 68 to provide an even more secure connection.

Figure 8:
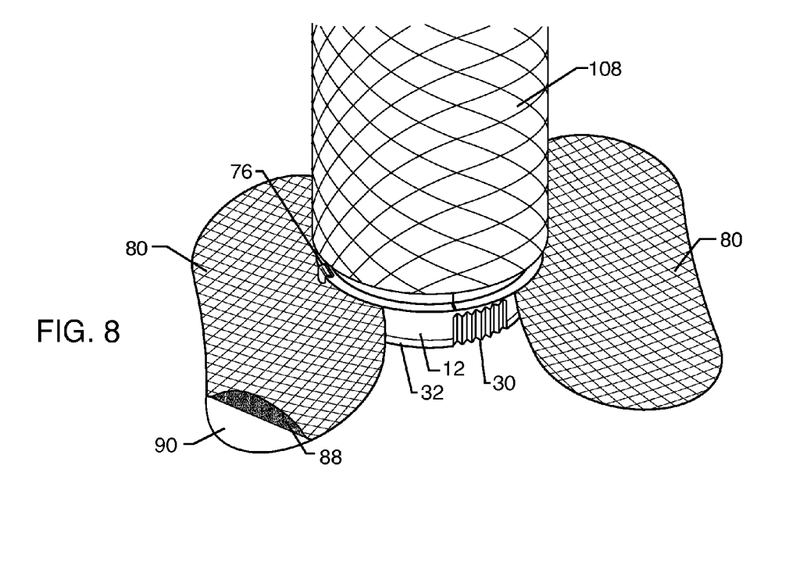

The next step in the insulation process, as illustrated in FIG. 8, is to slide insulation 106 and outer jacket 108 over clamping means 40, and, if applicable, securing means 78.

Figures 9, 10, 11:
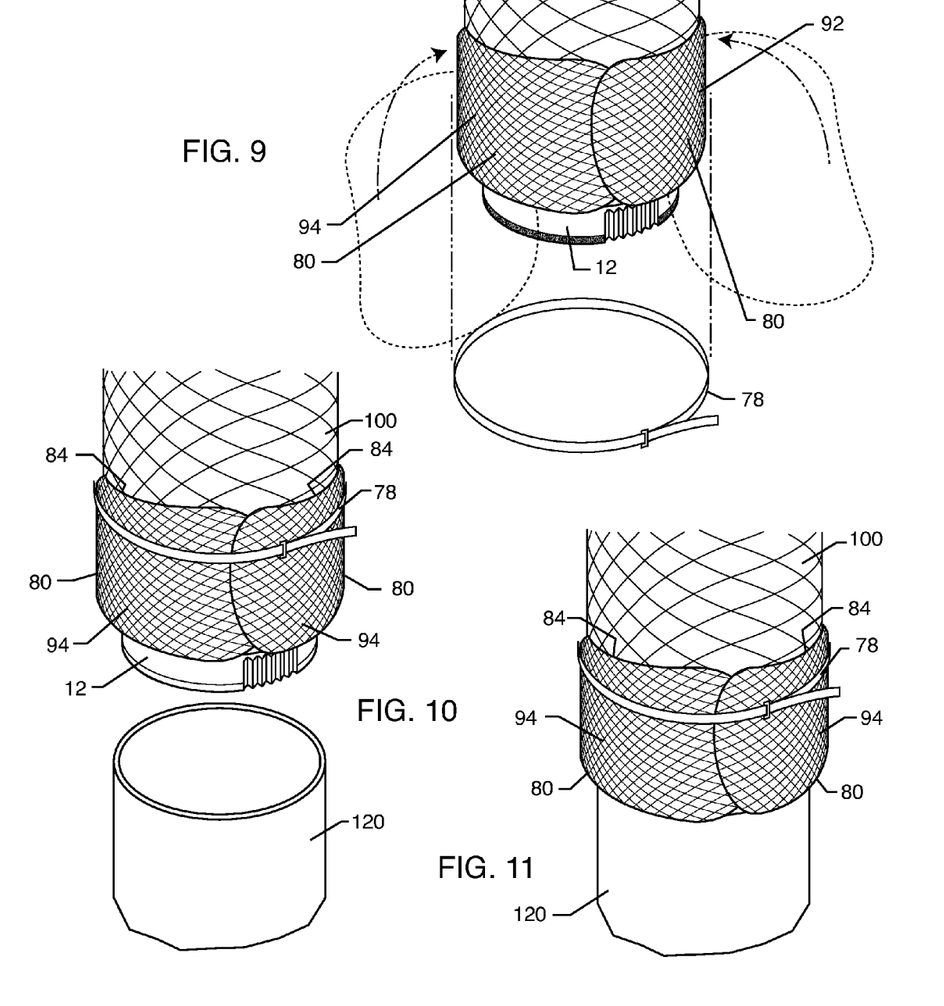

Next, as illustrated in FIGS. 8 and 9, outer wraps 80 are deployed. First end 82 of each outer wrap 80 is attached to the outer surface 14 of cylindrical pipe 12, while each second end 84 of each outer wrap 80 is initially positioned inside of cylindrical pipe 12. Each outer wrap 80 is deployed by moving second end 84 from out of cylindrical pipe 12. Backing 88 on outer wrap 80 is removed from the adhesive side 86 of outer wrap 80 to expose adhesive 90. Adhesive side 86 of each outer wrap 80 is applied to outer jacket 108 by applying adhesive 90 to outer jacket 108. Optionally, a securing means 78 may then by applied over outer wraps 80 as shown in FIG. 10. The non-adhesive side 92 of each outer wrap 80 now faces away from flex duct connector 10 and may include an identifying element 94, which may be a bright color or a company logo to easily identify that the flex-duct end connector 10 according to the present invention is being used.

The final step in the connection process is to connect second end 28 of cylindrical pipe 12 to 120. Second end 28 may include crimping 30 (for male connections), depending on the characteristics of the fitting 120, as shown in FIG. 11. By providing a rubberized coating 32 at second end 28 of cylindrical pipe 12, flex-duct end connector 10 provides an airtight fit with fitting 120. If desired, a securing means 78, such as a zip tie, can then be applied.

The foregoing description of an exemplary embodiment of the present invention has been presented for purposes of enablement, illustration, and description. It is not intended to be exhaustive of or to limit the present invention to the precise forms discussed. There may be, however, other configurations of HVAC connectors not specifically described herein, but with which the present invention is applicable. The present invention should therefore not be seen as limited to the particular embodiment described herein; rather, it should be understood that the present invention has wide applicability with respect to HVAC connectors. Such other configurations can be achieved by those skilled in the art in view of the description herein. Accordingly, the scope of the invention is defined by the following claims.

What is claimed is:

1. A connector for connecting flex-duct to a fitting comprising:
   a generally cylindrical pipe, said pipe having an outer surface, an inner surface, a first end and a second end, said outer surface having one or more raised ridges;
   a clamping means configured to fit over said pipe, said clamping means comprising:
     a first semi-cylindrical clamp having an outer surface, an inner surface, a first end, a second end, a pair of opposed edges extending between said first end and said second end, and at least one raised ridge on said outer surface; and
     a second semi-cylindrical clamp having an outer surface, an inner surface, a first end, a second end, a pair of opposed edges extending between said first end and said second end, at least one receiver for receiving a fastener, and at least one raised ridge on said outer surface, whereby said opposed edges of said second clamp and said opposed edges of said first clamp are configured to overlap when applied to said pipe; and
   a plurality of outer wraps, each said outer wrap having a first end and a second end, said first end connected to said outer surface of said pipe, each said outer wrap having an adhesive side and a non-adhesive side.

2. The connector according to claim 1, further comprising adhesive on said outer surface of said pipe.

3. The connector according to claim 1, further comprising adhesive on said inner surface of said first clamp and said inner surface of said second clamp.

4. The connector according to claim 1, wherein said wherein said non-adhesive side of each of said outer wraps includes an identifying element.

5. The connector according to claim 1, wherein said first end of said pipe is tapered.

6. The connector according the claim 1, wherein said second end of said pipe is crimped.

7. The connector according to claim 1, wherein said second end of said pipe includes a rubberized coating.

8. The connector according to claim 1, wherein said first and second clamps are connected to said pipe.

9. A method for connecting flex-ducting to a fitting, said flex-ducting having a liner, an insulation layer, an outer jacket and a connecting end, the method comprising the steps of:
   folding the insulation layer and the outer jacket away from the liner of the flex-ducting at the connecting end, thereby exposing the liner;
   providing a connector, said connector comprising:
     a generally cylindrical pipe, said pipe having an outer surface, an inner surface, a first end and a second end, said outer surface having one or more raised ridges;
     a clamping means configured to fit over said pipe, said clamping means further comprising:
       a first semi-cylindrical clamp having an outer surface, an inner surface, a first end, a second end, a pair of opposed edges extending between said first end and said second end, and at least one raised ridge on said outer surface; and
       a second semi-cylindrical clamp having an outer surface, an inner surface, a first end, a second end, a pair of opposed edges extending between said first end and said second end, at least one receiver for receiving a fastener, and at least one raised ridge on said outer surface, whereby said opposed edges of said second clamp and said opposed edges of said first clamp are configured to overlap and said raised ridges configured to align with each other and with one of said raised ridges on said pipe; and a plurality of outer wraps, each said outer wrap having a first end and a second end, said first end connected to said outer surface of said, and each having an adhesive side and a non-adhesive side;

sliding the exposed liner over said first end of said pipe until said liner extends past at least one of said raised ridges;

applying the clamps to said liner and said pipe;

inserting a fastener in said at least one receiver;

sliding the insulation and outer jacket over said clamping means;

applying the adhesive side of each of said outer wraps to said outer jacket; and connecting said second end of said pipe to said fitting.

10. The method according to claim 9, further including the step of:

providing adhesive to the outer surface of said pipe.

11. The method according to claim 9, further including the step of:

providing adhesive to the inner surface of said first clamp and said second clamp.

12. The method according to claim 9, further including the step of:

providing an identifying element on the non-adhesive side of said outer wraps.

13. The method according to claim 9, further including the step of:

applying a securing means over said clamps prior the step of inserting a fastener in said at least one receiver.

14. The method according to claim 9, further including the step of:

applying a securing means over said outer wraps.

15. A connector for connecting flex-duct to a fitting comprising:

a generally cylindrical pipe, said pipe having an outer surface, an inner surface, a first end and a second end;

a clamping means configured to fit over said pipe; and a plurality of outer wraps, each said outer wrap having a first end and a second end, said first end connected to said outer surface of said pipe, each said outer wrap having an adhesive side and a non-adhesive side, wherein said clamping means further comprises:

a first semi-cylindrical clamp having an outer surface, an inner surface, a first end, a second end, a pair of opposed edges extending between said first end and said second end, at least one receiver for receiving a fastener; and a second semi-cylindrical clamp having an outer surface, an inner surface, a first end, a second end, a pair of opposed edges extending between said first end and said second end, whereby said opposed edges of said second clamp and said opposed edges of said first clamp are configured to overlap when applied to said cylindrical pipe.

16. The connector according to claim 15, further comprising adhesive on said outer surface of said pipe.

17. The connector according to claim 15, further comprising adhesive on said inner surface of said first clamp and said inner surface of said second clamp.

18. The connector according to claim 15, wherein said clamping means is connected to said pipe.

* * * * *